(12) United States Patent
Shen

(10) Patent No.: US 6,564,568 B1
(45) Date of Patent: May 20, 2003

(54) REFRIGERATING COMPRESSOR CONTROL CIRCUIT

(76) Inventor: Kuei-Hsien Shen, 2/F., No. 108, Hsintai 5th Rd., Sec. 1, Hsichih City, Taipei County (TW)

( * ) Notice: Subject to any disclaimer, the term of this patent is extended or adjusted under 35 U.S.C. 154(b) by 0 days.

(21) Appl. No.: 09/987,219

(22) Filed: Nov. 14, 2001

(51) Int. Cl.$^7$ .............................. F25B 1/00; H02H 7/00
(52) U.S. Cl. ........................................ 62/230; 361/22
(58) Field of Search ............................ 62/230, 228.1, 62/228.3, 158; 361/22; 318/778

(56) References Cited

U.S. PATENT DOCUMENTS

| | | | | |
|---|---|---|---|---|
| 3,742,302 A | * | 6/1973 | Neill | 317/13 R |
| 3,742,303 A | * | 6/1973 | Dageford | 317/13 A |
| 3,946,574 A | * | 3/1976 | Portera | 62/158 |
| 4,084,406 A | * | 4/1978 | Brenneman | 62/211 |
| 4,510,547 A | * | 4/1985 | Rudich, Jr. | 361/22 |
| 5,926,010 A | * | 7/1999 | Hosokawa et al. | 323/222 |
| 5,952,811 A | * | 9/1999 | Hamatani | 318/788 |

\* cited by examiner

Primary Examiner—Denise L. Esquivel
Assistant Examiner—Marc Norman
(74) Attorney, Agent, or Firm—Rosenberg, Klein & Lee

(57) ABSTRACT

A refrigerating compressor control circuit installed in a refrigerator and connected between AC power supply and the compressor motor of the refrigerator and adapted for controlling the operation of the compressor motor, the refrigerating compressor control circuit including a CPU (central processing unit), a current phase detector, a voltage phase detector, a trigger circuit having a TRIAC, a voltage level detector, a high current detector, a low current detector, an input filter, and an output filter. The CPU starts the compressor motor a length of time delay after a sudden shutdown, preventing damage to the compressor motor due to high pressure of cooling agent, and controls the output voltage value subject to the status of the load at the compressor motor.

1 Claim, 2 Drawing Sheets

REFRIGERATING COMPRESSOR CONTROL CIRCUIT

BACKGROUND OF THE INVENTION

The present invention relates to a refrigerating compressor control circuit and, more particularly, to such a refrigerating compressor control circuit, which controls the output voltage value subject to the status of the load at the compressor motor.

During the operation of a refrigerator, two problems may be encountered. One problem is the affect of the pressure of cooling agent in starting the compressor motor. The other problem is the way of saving power during running of the compressor. The cooling agent is compressed to the condenser and then condensed from gas state to liquid state. The liquid state cooling agent is further delivered through an expansion valve to an evaporator to absorb heat. When heated, the cooling agent is turned to gas state again, and then compressed to the condenser by the compressor. This action is repeated again and again. During the circulation of the cooling agent between gas state and liquid state, a pressure is produced in the piping. A certain time after shutdown of the refrigerator, the pressure in the piping reduces. If the compressor motor shut down suddenly during its operation, the operator cannot immediately start the compressor motor again because the pressure in the piping increases the load of the compressor motor. When starting the compressor motor under a high pressure, a high starting current will be produced, causing damage to the compressor motor. In order to prevent this problem, the operator must wait for a certain length of time, and then start the compressor motor after the pressure in the piping has been reduced to a low level. However, the operator cannot accurately judge the accurate pressure dropping time. An alternate way to prevent this problem is the use of a heat sensitive overload protective switch in conjunction with a relay. The heat sensitive overload protective switch automatically cuts off power supply from the compressor motor upon an overload. The relay automatically starts the motor within a set time. The use of the heat sensitive overload protective switch greatly increases the cost of the machine. Further, the heat sensitive overload protective switch has the drawbacks of a contact switch. With respect to the operation of the compressor motor, the initial current value (starting current) is high. After started, the compressor motor runs with relatively smaller current, which is within the rated current range. When an induction motor runs not at the full load, it consumes much power than the actual requirement because a certain amount of power is wasted. The percentage of wasted amount of power becomes greater when the load is relatively reduced.

SUMMARY OF THE INVENTION

The present invention has been accomplished under the circumstances in view. It is the main object of the present invention to provide a refrigerator compressor control circuit, which starts the compressor motor a length of time delay after a sudden shutdown, preventing damage to the compressor motor due to high pressure of cooling agent. It is another object of the present invention to provide a refrigerator compressor control circuit, which controls the output voltage value subject to the status of the load at the compressor motor, so as to save power consumption. According to the present invention, the refrigerator compressor control circuit comprises a CPU (central processing unit), a current phase detector, a voltage phase detector, a trigger circuit having a TRIAC, a voltage level detector, a high current detector, a low current detector, an input filter, and an output filter. The current phase detector comprises a photo coupling crystal connected between the CPU and the TRIAC of the trigger circuit, and is adapted for detecting current phase and providing a feedback signal to the CPU to determine the triggering angle. The voltage phase detector is connected between the AC power supply and the CPU, comprised of a plurality of diodes and resistors, and adapted for detecting the time of zero voltage so as to obtain the voltage phase, for enabling the CPU to measure the load of the compressor motor by comparing the voltage phase obtained from the voltage phase detector with the current phase obtained from the current phase detector so as to determine the triggering angle of the TRIAC of the trigger circuit. The trigger circuit comprises a photo coupling crystal and the TRIAC, the TRIAC having a first end connected to AC power supply, a second end connected to the CPU through the photo coupling crystal of the trigger circuit, and a third end connected to the load of the compressor motor of the refrigerator. The voltage level detector is comprised of a diode, a capacitor, and a plurality of resistors, and adapted for detecting input voltage and providing the detected input voltage value to the CPU, causing the CPU to stop sending signal to the trigger circuit and to turn off the trigger circuit when the input voltage value surpasses a predetermined level. The high current detector is comprised of a plurality of resistors, a capacitor, and a grounded comparator, and adapted to provide a signal to the CPU immediately when the current at the load of the compressor motor of the refrigerator surpasses a predetermined high current level, causing the CPU to shut down the refrigerator. The low current detector is comprised of a plurality of resistors, a capacitor, and a grounded comparator, and adapted for providing a signal to the CPU immediately when the current at the load of the compressor motor of the refrigerator drops below a predetermined low current level, causing the CPU to make a full voltage output to start the compressor motor of the refrigerator at 0 triggering angle. The CPU has set therein predetermined control signal parameter values and start time value subject to the load of the compressor motor of the refrigerator, and adapted for receiving signals from the other sub-circuits of the refrigerating compressor control circuit, comparing the signals received, and outputting a control signal to the compressor motor of the refrigerator subject to the comparison result.

DETAILED DESCRIPTION OF THE PREFERRED EMBODIMENT

Figure 1:
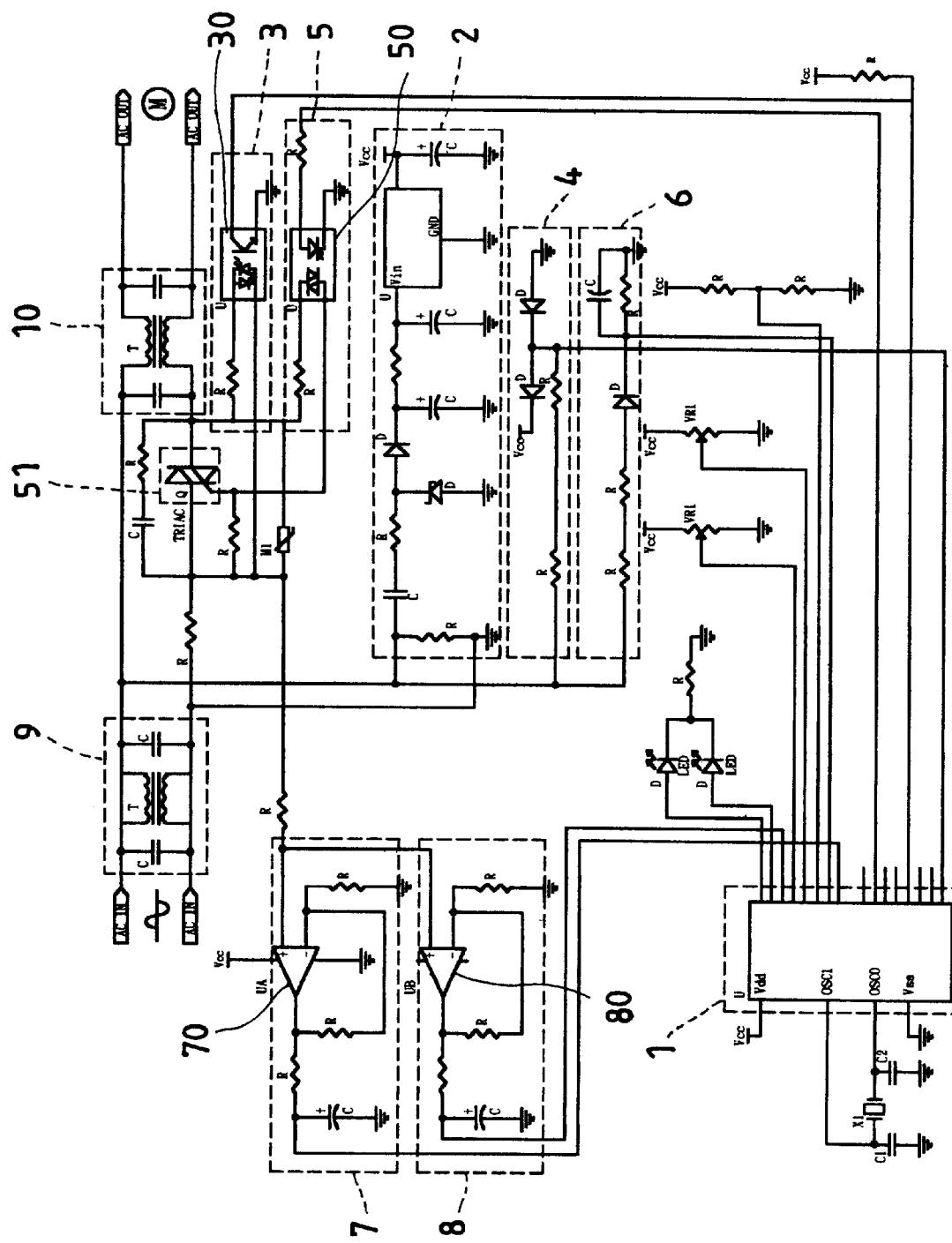
FIG. 1 is circuit diagram of a refrigerating compressor control circuit according to the present invention.

Referring to FIG. 1, a refrigerating compressor control circuit is installed in the circuit between the power source and the compressor motor M, comprising a CPU 1, a power circuit 2, which provides the necessary working voltage, a current phase detector 3, a voltage phase detector 4, a trigger circuit 5, a voltage level detector 6, a high current detector 7, a low current detector 8, an input filter 9, and an output end filter 10.

The current phase detector 3 comprises a photo coupling crystal 30 connected between the CPU 1 and a TRIAC 51 of the trigger circuit 5, and adapted for detecting current phase, i.e., the zero time of feedback current for enabling the CPU 1 to determine the triggering angle.

The voltage phase detector 4 is connected between the power source and the CPU 1, and comprised of diodes D and resistors R. The voltage phase detector 4 detects the time of zero voltage so as to obtain the voltage phase. The CPU 1 measures the condition of load of the compressor motor M by comparing the voltage phase obtained from the voltage phase detector 4 with the current phase obtained from the current phase detector 3, and determines the triggering angle of the TRIAC 51 of the trigger circuit 5 subject to the comparison result. The triggering angle is indirectly proportional to the load of the compressor motor M, the lower of the load of the compressor motor M is the greater the triggering angle of the TRIAC 51 will be. A wide triggering angle of the TRIAC 51 saves much power. On the contrary, a narrow triggering angle of the TRIAC 51 saves less power.

The trigger circuit 5 comprises a photo coupling crystal 50, and the aforesaid TRIAC 51. The TRIAC 51 has one end connected to power source, and another end connected to the CPU 1 through the photo coupling crystal 50. The CPU 1 controls the TRIAC 51 to achieve a current-chopping triggering effect. The other end of the TRIAC 51 is connected to the load of the compressor motor M.

The voltage level detector 6 is comprised of a diode D, a capacitor C, and resistors R. The voltage level detector 6 detects input voltage and provides the detected input voltage value to the CPU 1. When the input voltage value surpasses a predetermined level, the CPU 1 stops sending the control signal to the trigger circuit 5, thereby causing the trigger circuit 5 to be turned to the "off" status to cut off the output of power, preventing the compressor motor M from damage.

The high current detector 7 is comprised of resistors R, a capacitor C, and a comparator 70. The comparator 70 is grounded. When the current at the load surpasses the predetermined high current level, the high current detector 7 immediately provides a signal to the CPU 1, causing the CPU 1 to shut down the machine.

The low current detector 8 is comprised of resistors R, a capacitor C, and a comparator 80. The comparator 80 is grounded. When the current at the load drops below the predetermined low current level, the low current detector 8 immediately provides a signal to the CPU 1, causing the CPU 1 to make a full voltage output, i.e., the triggering angle is at "0" so that sufficient voltage is provided to the compressor motor M for normal functioning.

The input end filter 9 eliminates interference of impulse wave and noises with input power. The output end filter 10 eliminates feedback noises from the compressor motor M.

The CPU 1 has set therein control signal parameter values and start time value subject to the load of the compressor motor. The CPU 1 receives signals from the other component parts of the refrigerating compressor control circuit, compares the signals received, and outputs a control signal to the compressor motor M subject to the comparison result.

The functioning, effect, and advantages of the present invention are outlined hereinafter.

Figure 2:
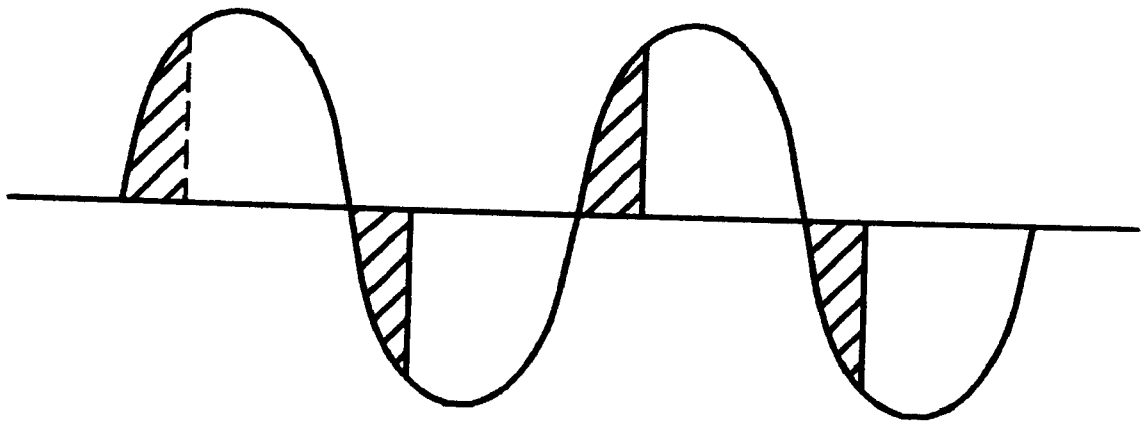
FIG. 2 is a schematic drawing showing a triggering angle according to the present invention.

Normal Start (Starting After a Long Time of Shutdown):

When starting the compressor motor M, a high starting current, usually about 3~7 times of the rated current, is required. At this time, as shown in FIG. 2, the triggering angle is 0. When electrically connected after a long time of shutdown, the CPU drives the photo coupling crystal 50 of the trigger circuit 5 to turn on the TRIAC 51 by means of 0 triggering angle, so as to achieve "full voltage start". This state does not save power due to high torsion requirement, i.e., when supplying power to start the compressor motor M, the CPU 1 does not output a power saving control signal, and the trigger circuit 5 triggers the circuit at 0 triggering angle without chopping, enabling full voltage to be supplied to the compressor motor M.

Normal running (continuous running after start):

After started, the motor shaft of the compressor motor M is kept at the inertia status, i.e., no "full voltage" is necessary for normal running of the compressor motor M. At this time, the circuit enters "power saving" status. The invention achieves this power saving status due to the effect of the current phase detector 3 and the voltage phase detector 4 and the current The current phase detector 3 feeds detected current phase information back to the CPU 1. The voltage phase detector 4 provides detected voltage phase information to the CPU 1. The CPU 1 obtains the information of the load subject to the phase angle of the current over the voltage, i.e., the phase difference between the voltage and the current, and then outputs an instruction to the TRIAC 51 of the trigger circuit 5 via the photo coupling crystal 50 to control the triggering angle of the TRIAC 51 subject to the information of the load obtained and the preset program. In general, the CPU 1 controls the triggering angle of the TRIAC 51 subject to the level of the load of the compressor motor M. When the load of the compressor motor M is relatively increased, the angle of the current passing over the voltage is relatively reduced, the triggering angle becomes relatively smaller, and less power is saved, so that sufficient power is provided to the compressor motor M to rotate the motor shaft. On the contrary, when the load of the compressor motor M is relatively reduced, the angle of the current passing over the voltage is relatively increased, the triggering angle becomes relatively greater, and more power is saved. According to the law of power, P (power)=V (voltage)×I (current)×PF (power factor). When I is reduced, V is lowered, PF is increased. Therefore, reducing P achieves power saving effect. The invention achieves "chopping effect" (see FIG. 2) subject to the range of triggering angle. The greater the triggering angle is the greater the chopping area and power saving rate will be. However, an excessive triggering angle causes an excessive voltage drop, resulting in insufficient torsional force and excessively high current. In this case, the compressor motor M may be damaged. In order to eliminate this problem, the triggering angle must be properly controlled to keep normal functioning of the compressor motor M. In general, when the load is light, it is not necessary to provide full wave (full power) to the compressor motor M to keep the compressor motor M functioning normally. The invention chops input power subject to the condition of the load, so as to achieve a power saving effect.

Sudden start immediately after shutdown:

When the compressor motor M is shut down suddenly during its running due to a certain reason (for.example, sudden power failure), the compressor motor M will be started immediately. When started, the cooling agent in the coil is compressed to produce a pressure. If the pressure in the coil is not dropped to a low level, the starting load of the compressor motor M will be very high, causing a high starting current (higher than the starting current to start the compressor motor M after a long time of shutdown). Therefore, it is necessary to drop the voltage before starting the compressor motor M at this time. In order to prevent a high starting current due to a high pressure when starting the compressor motor M immediately after shutdown, the CPU 1 outputs a triggering signal to start the compressor motor M after "pressure dropping time". The value of "pressure dropping time" is determined subject to the capacitor of the compressor motor M. In case a high starting current is produced after "pressure dropping time" due to the existence of an excessively high pressure, the high current detector 7 detects the high current, and provides the information to the CPU 1, causing the CPU 1 not to output the triggering signal to start the compressor motor M. After another "pressure dropping time", the CPU 1 outputs the triggering signal to start the compressor motor M. Therefore, the present invention automatically controls the operation of the compressor motor M. Even if a manual operation is employed to start the compressor motor M, the compressor motor M is prohibited from working before dropping the voltage value to the suitable range.

Excessive high/low current protection and control:

When an excessive high current is produced due to an overload, the comparator 70 of the high current detector 7 detects the status and provides the information to the CPU 1, thereby causing the CPU 1 stops triggering the TRIAC 51, and therefore the compressor motor M is turned off. This function protects the compressor motor M against overload, and prevents high voltage starting of the compressor motor M. The stopping time of the compressor motor M due to an overload is determined subject to the range of the current surpassed the rating current. A small overload allows a relatively longer time of overload. The allowable time of overload is shortened when the overload is heavy. Therefore, the invention allows a longer time of overload upon a small overload, and a normal high starting current for starting the compressor motor M. However, the invention immediately stops the compressor motor M upon an abnormal high starting current. When the compressor motor M stopped due to an excessively high current, the CPU 1 automatically controls the re-starting time, enabling the compressor motor M to be started after a set length of time to prevent starting of the compressor motor M under a high pressure.

In addition to the compressor, a regular freezer or refrigerator further comprises a thermostat, a compressor cooling fan, and illuminator means. When stopped the compressor before installation of the installation of the refrigerating compressor control circuit in the power control or operation control means of the freezer/refrigerator, the thermostat, compressor cooling fan, and illuminator means of the freezer/refrigerator may keep working, resulting in low voltage and/or low current output. For example, when the cooling fan, the illuminator means, and the compressor are stopped, the thermostat still consumes a small amount of electric current, and the output voltage is also low. In this case, it may be unable to start the compressor due to excessively low voltage. The invention eliminates this problem. The comparator 80 of the low current detector 8 provides a signal a signal to the CPU 1 upon a low current below the set low level, thereby causing the CPU 1 to trigger the TRIAC 51 for full voltage output. Therefore, a full voltage is provided for normal starting of the motor when starting the compressor again after rising of temperature.

Further, the input voltage may be higher than the allowable voltage of the compressor under the power saving status, however the pressure dropping effect causes the output voltage to be reduced to the allowable voltage level without causing damage to the compressor. If the input voltage is excessively high, it may be unable to drop the output voltage to the allowable voltage level. When the input voltage is excessively high, the CPU 1 stops triggering the TRIAC 51, preventing running of the compressor under a high voltage. Therefore, the invention provides double protection against high voltage, one is to drop high voltage to the allowable level, enabling the compressor to work normally; the other is to stop the compressor from operation when the level of output voltage is still higher than the rated level after a voltage drop. Further, excessive low voltage may cause damage to the motor. In case the input voltage is within the allowable range but the output voltage is excessively low, the invention shifts to power saving status, providing full voltage output to the motor. However, if the input voltage is lower than the allowable range, the invention stops the motor, preventing damage to the compressor. Therefore, the voltage level detector 6 provides voltage high and voltage super high protections as well as voltage low and voltage super low protections.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A refrigerating compressor control circuit installed in a refrigerator and connected between an AC power supply and a compressor motor of the refrigerator and adapted for controlling the operation of the compressor motor, the refrigerating compressor control circuit comprising a CPU (central processing unit), a current phase detector, a voltage phase detector, a trigger circuit having a TRIAC, a voltage level detector, a high current detector, a low current detector, an input filter, and an output filter, wherein:

said current phase detector comprises a photo coupling crystal connected between said CPU and the TRIAC of said trigger circuit, and is adapted for detecting current phase and providing a feedback signal to said CPU to determine the triggering angle;

said voltage phase detector is connected between the AC power supply and said CPU, and comprises a plurality of diodes and resistors, said voltage phase detector being adapted for detecting the time of zero voltage so as to obtain the voltage phase, for enabling said CPU to measure the load of the compressor motor by comparing the voltage phase obtained from said voltage phase detector with the current phase obtained from said current phase detector so as to determine the triggering angle of the TRIAC of said trigger circuit;

said trigger circuit comprises a photo coupling crystal and said TRIAC, said TRIAC having a first end connected to the AC power supply, a second end connected to said CPU through the photo coupling crystal of said trigger circuit, and a third end connected to the load of the compressor motor of said refrigerator;

said voltage level detector comprises a diode, a capacitor, and a plurality of resistors, and is adapted for detecting input voltage and providing the detected input voltage value to said CPU, causing said CPU to stop sending signal to said trigger circuit and to turn off said trigger circuit when the input voltage value surpasses a predetermined level;

said high current detector comprises a plurality of resistors, a capacitor, and a grounded comparator, and is adapted to provide a signal to said CPU immediately when the current at the load of the compressor motor of said refrigerator surpasses a predetermined high current level, causing said CPU to shut down the refrigerator;

said low current detector comprises a plurality of resistors, a capacitor, and a grounded comparator, and is adapted for providing a signal to said CPU immediately when the current at the load of the compressor motor of said refrigerator drops below a predetermined low current level, causing said CPU to make a full voltage output to start the compressor motor of said refrigerator at 0 triggering angle;

said CPU has set therein predetermined control signal parameter values and start time value subject to the load of the compressor motor of said refrigerator, and adapted for receiving and comparing signals, and outputting a control signal to the compressor motor of said refrigerator subject to the comparison result.

\* \* \* \* \*